United States Patent
Kim

(10) Patent No.: US 9,898,829 B2
(45) Date of Patent: Feb. 20, 2018

(54) MONITORING APPARATUS AND SYSTEM USING 3D INFORMATION OF IMAGES AND MONITORING METHOD USING THE SAME

(71) Applicant: HANWHA TECHWIN CO., LTD., Changwon-si (KR)

(72) Inventor: Chang Soo Kim, Changwon-si (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 921 days.

(21) Appl. No.: 14/029,074

(22) Filed: Sep. 17, 2013

(65) Prior Publication Data

US 2014/0078263 A1    Mar. 20, 2014

(30) Foreign Application Priority Data

Sep. 18, 2012  (KR) .................. 10-2012-0103420
Aug. 21, 2013  (KR) .................. 10-2013-0099097

(51) Int. Cl.
*H04N 13/02*    (2006.01)
*G06T 7/20*     (2017.01)
(Continued)

(52) U.S. Cl.
CPC ............ *G06T 7/2093* (2013.01); *G06T 7/285* (2017.01); *G06T 2207/10021* (2013.01);
(Continued)

(58) Field of Classification Search
None
See application file for complete search history.

(56) References Cited

U.S. PATENT DOCUMENTS 6,778,207 B1     8/2004  Lee et al.
7,460,130 B2 *  12/2008  Salganicoff ........ A61B 5/14532
                                                          345/561
(Continued)

FOREIGN PATENT DOCUMENTS

CN    102006461 A    4/2011
JP   2006-215939 A   8/2006
(Continued)

OTHER PUBLICATIONS

Communication, Issued by the State Intellectual Property Office of P.R. China, dated Jan. 27, 2015, in counterpart Chinese Application No. 201310426387.2.

*Primary Examiner* — James M Anderson, II
(74) *Attorney, Agent, or Firm* — Sughrue Mion, PLLC

(57) ABSTRACT

A monitoring apparatus using three-dimensional (3D) information of images includes: an image acquisition unit to acquire a two-dimensional (2D) image from a pan/tilt/zoom (PTZ) camera; an information extraction unit to extract 2D coordinate information of an object based on a pan/tilt angle of the PTZ camera and extract distance information between the PTZ camera and the object; an operation unit to calculate at least one of variation of the 2D coordinate information and the distance information by comparing a current frame and a previous frame of the 2D image, and variation of the 2D coordinate information and height information of the object by comparing a current frame and a previous frame of a 3D image of the object; and a position tracking unit to track a position of the object by controlling the PTZ camera based on the at least one of the two variations.

16 Claims, 3 Drawing Sheets

(51) Int. Cl.
  *G06T 7/285* (2017.01)
  *H04N 5/232* (2006.01)
  *G08B 13/196* (2006.01)
  *H04N 5/247* (2006.01)

(52) U.S. Cl.
  CPC .............. *G06T 2207/20224* (2013.01); *G06T 2207/30232* (2013.01); *G06T 2207/30244* (2013.01); *G08B 13/19608* (2013.01); *H04N 5/232* (2013.01); *H04N 5/247* (2013.01); *H04N 13/02* (2013.01)

(56) References Cited

U.S. PATENT DOCUMENTS

| | | | |
|---|---|---|---|
| 8,090,251 B2 | 1/2012 | Campbell et al. | |
| 2006/0187305 A1* | 8/2006 | Trivedi | G06K 9/00234 348/169 |
| 2012/0154599 A1* | 6/2012 | Huang | H04N 5/232 348/169 |

FOREIGN PATENT DOCUMENTS

| | | |
|---|---|---|
| JP | 2006-303989 A | 11/2006 |
| JP | 2011-77982 A | 4/2011 |
| JP | 2012-114563 A | 6/2012 |
| KR | 2001-0096556 A | 11/2001 |
| KR | 20-0341237 Y1 | 2/2004 |
| KR | 20-0350161 Y1 | 5/2004 |
| KR | 10-2010-0015141 A | 2/2010 |
| KR | 10-2010-0096684 A | 9/2010 |
| KR | 10-2011-0050843 A | 5/2011 |
| KR | 10-2011-0065785 A | 6/2011 |
| KR | 10-2012-0014433 A | 2/2012 |

* cited by examiner

MONITORING APPARATUS AND SYSTEM USING 3D INFORMATION OF IMAGES AND MONITORING METHOD USING THE SAME

CROSS-REFERENCE TO RELATED APPLICATIONS

This application claims priority from Korean Patent Application No. 10-2012-0103420 filed on Sep. 18, 2012 and Korean Patent Application No. 10-2013-0099097 filed on Aug. 21, 2013 in the Korean Intellectual Property Office, the disclosures of which are incorporated herein in their entirety by reference.

BACKGROUND

1. Field

Apparatuses and methods consistent with exemplary embodiments relate to a monitoring apparatus and system using three-dimensional (3D) information of images, and a monitoring method using the same, and more particularly, to a monitoring apparatus and system using 3D information of images and a monitoring method using the same, which can acquire two-dimensional (2D) coordinates of an object according to a pan/tilt angle using a pan/tilt/zoom (PTZ) camera and 3D information of images that is distance information between the object and the camera according to a zoom scale, and continuously monitor and track a moving object through calculating variation of the 3D information according to movement of the object.

2. Description of the Prior Art

According to a general method for acquiring a 3D scene that is a stereoscopic image, two cameras for capturing left and right images are provided, and two sheets of different images having a difference in angle between the cameras are synthesized to complete a final 3D scene.

Further, in tracking a moving object, a position of the tracked object is obtained by calculating a variation of images on a 2D display, and a focus of a PTZ camera moves to the obtained position. For example, after capturing image frames, a position of an object is detected using the received image frames, and a moving speed of the object is calculated using at least one of the detected position of the object and a previously detected position of the object. Then, the position of the object when a predetermined time elapses is estimated using the detected position of the object and the calculated moving speed, and a variation of stereoscopic images is calculated on the basis of the estimated position of the object. Thereafter, a stereoscopic image is displayed on the basis of the calculated variation of the stereoscopic images.

According to the related art as described above, a position of an object is calculated to generate a stereoscopic image. If, however, a PTZ function camera is not provided, it is difficult to realize the stereoscopic image.

Korean Utility Model Registration No. 20-0350161 discloses a stereoscopic image security control device which provides a security function through sensing movement of an approaching object and preventing the approach of the object. Hereinafter, the details of the device will be described with reference to FIG. 1.

FIG. 1 is a configuration diagram of a stereoscopic image security control device in the related art, which is disclosed in Korean Utility Model Registration No. 20-0350161.

Referring to FIG. 1, the stereoscopic image security control device 1 is configured to perform automatic security management using stereoscopic image cameras 10, security devices 20 connected to driving motors 30 speakers 40, and communication modules 50 and 60 which are installed in several places of security compounds. Here, the communication modules 50 and 60 use dedicated interfaces (not shown) which are different from commonly obtainable general interfaces. Further, the dedicated stereoscopic image cameras 10 are not PTZ cameras that can continuously track an object in front thereof, and track an omnidirectional object in a wide area.

Further, a theoretical algorithm of an object tracking device in the related art is a method for searching for a moving object through calculation of a difference of an image in a previous scene and a current scene in a 2D (still image) state. For example, the object tracking device in the related art continuously captures an image of a moving object by calculating a variation of the image through detection of a change between a previous image and a current image, and updating pan coordinates and tilt coordinates of the object that is targeted for tracking. This method frequently misses or fails to check the object when the object is hidden by another object or the object passes to cross another object. That is, it is difficult to achieve a successful automatic object tracking.

SUMMARY

Accordingly, the inventive concept has been made to address the above-mentioned problems occurring in the related art. One or more exemplary embodiments provide a monitoring apparatus and system using 3D information of images and a monitoring method using the same, which can acquire 3D information of images through calculation of distance/height information of an object using all PTZ functions of PTZ cameras, obtaining coordinates of a moving object more accurately on the basis of the 3D information, and monitoring and tracking the moving object more accurately using the coordinates of the moving object.

One or more exemplary embodiments also provide a monitoring apparatus and system using 3D information of images and a monitoring method using the same, which can acquire a 3D image using PTZ cameras linked through a network, and omnidirectionally monitor and track a moving object while sharing the acquired image with other cameras through the network.

Various aspects of the inventive concept will be set forth in part in the description which follows and in part will become apparent to those having ordinary skill in the art upon examination of the following or may be learned from practice of the inventive concept.

According to an aspect of an exemplary embodiment, there is provided a monitoring apparatus including: an image acquisition unit configured to acquire a 2D image which is captured by a pan/tilt/zoom (PTZ) camera; an information extraction unit configured to extract 2D coordinate information of an object based on at least one of a pan angle and a tilt angle of the PTZ camera and extract distance information between the PTZ camera and the object based on a zoom scale of the PTZ camera; an operation unit configured to calculate at least one of variation of the 2D coordinate information and the distance information by comparing a current frame and a previous frame of the 2D image, and variation of the 2D coordinate information and height information of the object by comparing a current frame and a previous frame of a 3D image of the object; and a position tracking unit configured to track a position of the object by controlling the PTZ camera based on the at least one of the two variations.

According to an aspect of another exemplary embodiment, there is provided a monitoring system comprising a plurality of PTZ cameras each of which includes the above monitoring apparatus.

According to an aspect of the present invention, there is provided a monitoring method including: acquiring a two-dimensional (2D) image captured by a pan/tilt/zoom (PTZ) camera; extracting 2D coordinate information of an object based on at least one of a pan angle and a tilt angle of the PTZ camera and extracting distance information between the PTZ camera and the object based on a zoom scale of the PTZ camera; calculating at least one of variation of the 2D coordinate information and the distance information by comparing a current frame and a previous frame of the 2D image, and variation of the 2D coordinate information and height information of the object by comparing a current frame and a previous frame of a 3D image of the object; and tracking a position of the object by controlling the PTZ camera based on the at least one of the two variations.

According to an aspect of an exemplary embodiment, the PT cameras are fixed-type PTZ cameras, and thus, it is not necessary to install expensive movable-type 3D cameras.

Further, in the case of using the acquired images as evidential data for criminal identification, the plurality of objects can be discriminated through identification of the distance information and the overlapping object, which may be missed in the existing 2D display, and the PTZ cameras having the function of automatic tracking device can perform seamless object tracking in this method at a high success rate.

The 3D or stereoscopic images can be acquired using the plurality of network PTZ cameras using an Internet protocol, and thus, performance of the object tracking device can be considerably improved.

Further, since the object can be identified through addition of even height information of the object that is calculated from the stereoscopic images acquired using a plurality of image input devices, the performance of the automatic tracking device can be maximized, and since the method that is required for linking uses the Internet protocol, it is not necessary to construct dedicated communication modules.

Since the height information of the object is used if it is desired to track the object in the changed stereoscopic image, improved performance can be achieved in comparison to automatic object tracking device based on the existing 2D type image variation measurement method.

BRIEF DESCRIPTION OF THE DRAWINGS

The above and other aspects will be more apparent by describing in detail exemplary embodiments in conjunction with the accompanying drawings, in which.

DETAILED DESCRIPTION OF THE EXEMPLARY EMBODIMENTS

The inventive concept will now be described more fully hereinafter with reference to the accompanying drawings, in which exemplary embodiments thereof are shown. This inventive concept may, however, be embodied in different forms and should not be construed as limited to the embodiments set forth herein. Rather, these embodiments are provided such that this disclosure will be thorough and complete, and will fully convey the scope of the inventive concept to those skilled in the art. The same reference numbers may indicate the same components throughout the specification and drawings.

Unless defined otherwise, all technical and scientific terms used herein have the same meaning as commonly understood by one of ordinary skill in the art to which this inventive concept belongs. It is noted that the use of any and all examples, or exemplary terms provided herein is intended merely to better illuminate the inventive concept and is not a limitation on the scope of the inventive concept unless otherwise specified. Further, unless defined otherwise, all terms defined in generally used dictionaries may not be overly interpreted.

Hereinafter, the exemplary embodiments of the inventive concept will be described in detail with reference to the accompanying drawings.

Figure 1:
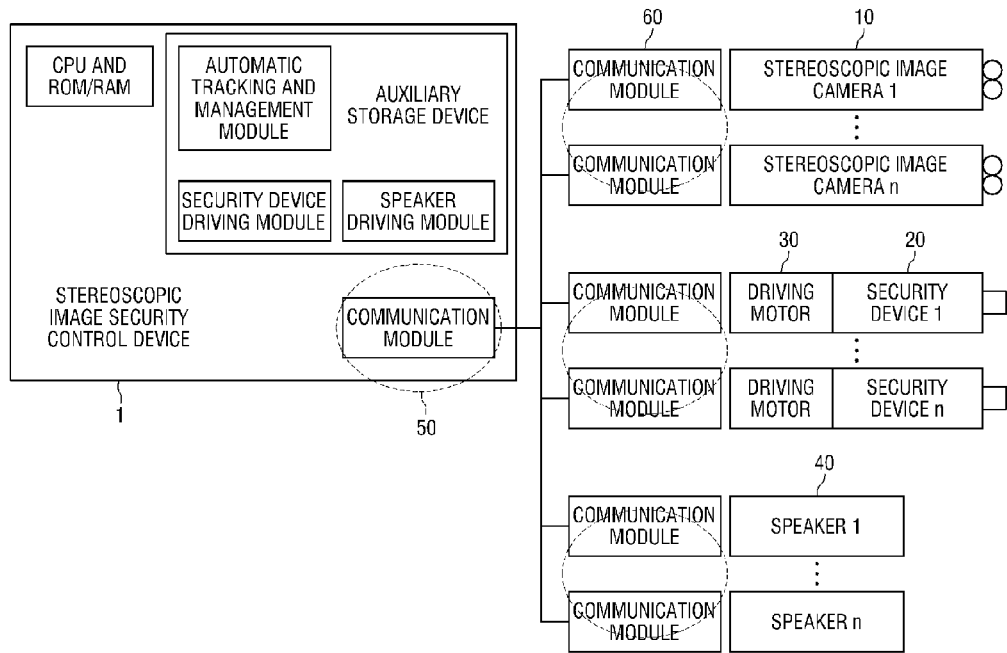
FIG. 1 is a configuration diagram of a stereoscopic image security control device in the related art.
Figure 2:
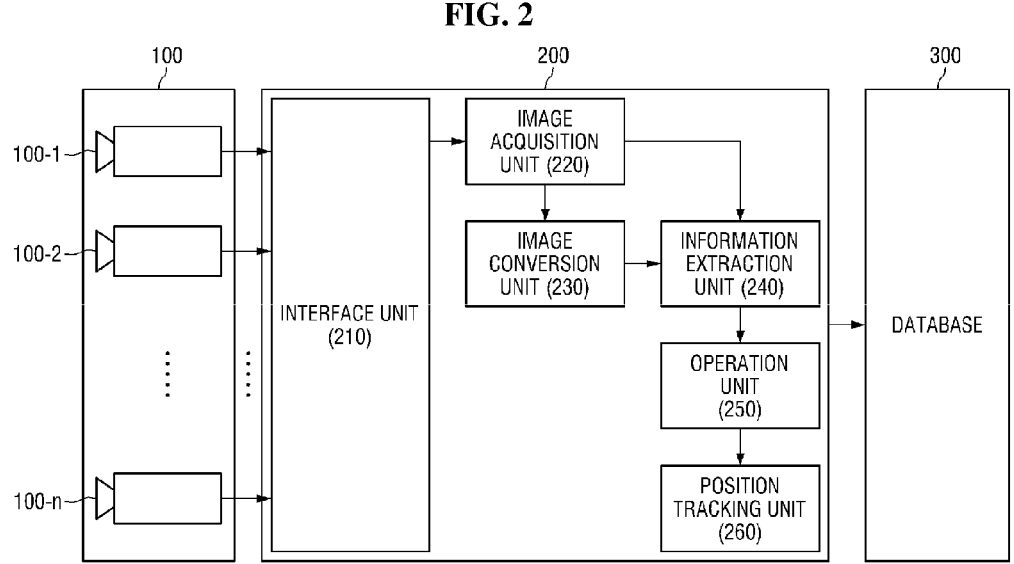
FIG. 2 is a configuration diagram of a monitoring apparatus using 3D information of images according to an exemplary embodiment.
Figure 3:
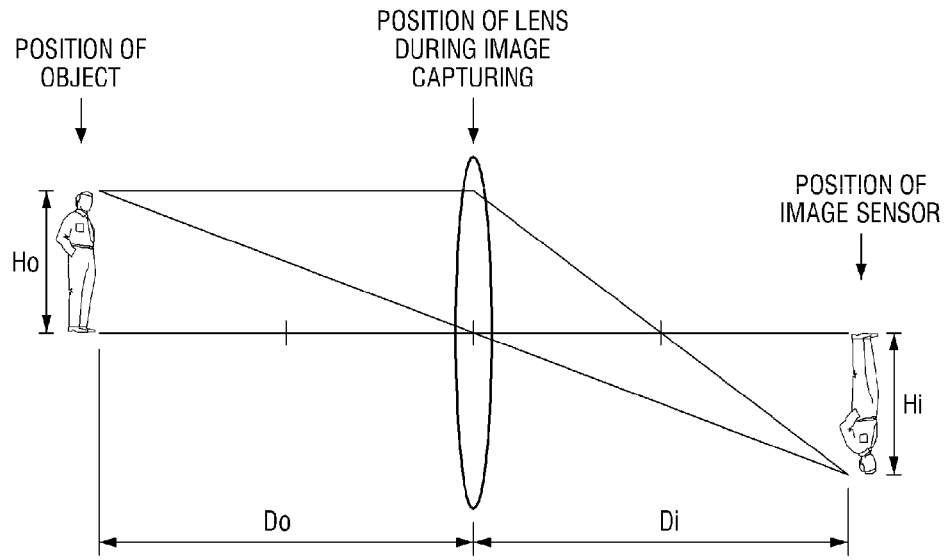
FIG. 3 is a diagram illustrating a distance relationship between a PTZ camera and an object according to a focus length of the PTZ camera, according to an exemplary embodiment.

FIG. 2 is a configuration diagram of a monitoring apparatus using 3D information of images according to an exemplary embodiment. Further, FIG. 3 is a diagram illustrating a distance relationship between a PTZ camera and an object according to a focus length of the PTZ camera, according to an exemplary embodiment.

Referring to FIG. 2, a monitoring apparatus 200 using 3D information of images according to an exemplary embodiment serves to extract 3D information of a moving object based on a pan/tilt angle and a zoom scale, which can be acquired from a plurality of PTZ cameras 100, i.e., 100-1 to 100-n, and track the moving object using a variation of the 3D information. Further, the monitoring apparatus 200 serves to acquire, process, and convert images captured from the PTZ cameras 100 into 3D stereoscopic images and track the moving object using the 3D stereoscopic images. Information and data which are acquired and processed by the monitoring apparatus 200 using the 3D information of the images are stored in a database 300 which may be included in the monitoring apparatus 200 or disposed separately from the monitoring apparatus 200. Here, the 3D information means three factors such as 3D coordinates which can indicate a position of an object in a stereoscopic space.

The monitoring apparatus 200 using the 3D information of the images includes an image acquisition unit 220, an information extraction unit 240, an operation unit 250, and a position tracking portion 260. The monitoring apparatus 200 may further include an interface unit 210 and an image conversion unit 230.

The interface unit 210 serves to link the PTZ cameras 100. Here, the interface unit 210 links the PTZ cameras 100 using a network, and specifically, may link the PTZ cameras 100 using an Internet protocol (IP). Accordingly, separate dedicated communication modules or methods are not required, and thus, a drawback of the related art can be overcome.

The PTZ cameras 100 are arranged to be fixed to specific positions. The PTZ cameras 100 may be arranged to face one another so that a dead zone can be minimized and an accuracy can be greatly improved as compared with the method of the related art searching for a position of an object through calculation of a variance between a current image and a previous image. At this time, data such as camera parameters including at least one of a pan angle, a tilt angle, a zoom scale and a focus length may be acquired from a PTZ camera 100 through the interface unit 210. The PTZ camera 100 may also store the captured images in an internal memory (not shown). Accordingly, image frames that come into a storage space in a predetermined period and the camera parameters of the image frames can be stored together.

The image acquisition unit 220 acquires a 2D image that is captured by at least one PTZ camera 100 through the interface unit 210. Further, the image acquisition unit 220 may acquire camera parameters of the PTZ camera 100 that are related to the 2D image through the interface unit 210 in addition to the 2D image. Since the PTZ camera 100 performs zoom-in/zoom-out and pan/tilt operations, the camera parameters corresponding to 3D movements of the camera can be obtained. If the PTZ camera 100 is fixed to a specific place and can perform pan/tilt operations, the PTZ camera may be able to recognize the camera parameters in real time, and image input (scene change or the like) to the PTZ camera 100 may not be irregular. The acquired 2D image may be converted into a compressed format in which the 2D image is compressed to facilitate data transfer. Image data in a compressed format may have various formats, such as Moving Picture Experts Group (MPEG)-1, MPEG-2 and MPEG-4. The 2D image that is acquired by the image acquisition unit 220 is transmitted to the image conversion unit 230 and/or the information extraction unit 240. At this time, respective 2D images that are captured by the plurality of PTZ cameras 100 are transmitted to the image conversion unit 230. Further, the camera parameters, such as pan angles, tilt angles and zoom scales of the PTZ cameras 100, may be transmitted to the information extraction unit 240, together with the 2D images captured by the PTZ cameras 100. As an example, the camera parameters may be sets of the pan angles, the tilt angles, the zoom scales and the focus lengths. Here, the camera parameters are acquired through the 3D movement of the PTZ cameras 100, such as zoom-in/zoom-out, pan and tilt.

The image conversion unit 230 synthesizes at least two 2D images acquired by the image acquisition unit 220 to convert these 2D images into a 3D image. For example, in synthesizing two 2D images, planar coordinate information, that is, 2D coordinate information, of an object in the 2D images by two PTZ cameras among the PTZ cameras 100 may be acquired, and also a distance between the two PTZ cameras may be acquired. The acquired 2D image information is mutually exchanged through the IP and used to change the two 2D images into a 3D image that is a stereoscopic image.

The PTZ cameras 100, which are fixed to specific places and can perform the pan/tilt operations, can recognize the above-described camera parameters in real time. Further, since the PTZ cameras 100 acquire images at fixed positions, image inputs (scene change or the like) may not be irregular. Through the 3D movement of the PTZ cameras 100, such as zoom-in/zoom-out, pan and tilt, the camera parameters are acquired. Through the 3D movement, the 3D information of the images may be obtained. Further, using the camera parameters of the PTZ cameras 100, the 3D image, in which two 2D images are synthesized, can be obtained.

The information extraction unit 240 extracts 2D coordinate information, which is position information of the object, from the 2D image, distance information between the PTZ camera 100 and the object, and height information of the object from the 3D image. Here, the 2D coordinate information and the distance information may be extracted on the basis of the 2D images acquired from the PTZ cameras 100 and camera parameters of the 2D images. Specifically, the information extraction unit 240 may extract the 2D coordinate information of the object based on the pan/tilt angles of the PTZ cameras 100, and may extract the distance information based on the zoom scales of the PTZ cameras 100. Further, the information extraction unit 240 may extract the height information of the object from the 3D image that is acquired through synthesizing the 2D images. The 2D coordinate information and the distance information may form first 3D information of the object, or the 2D coordinate information and the height information may form second 3D information of the object. The first and/or second 3D information of the object is stored in the database 300. Through this, it is possible to prevent the object from being missed or unchecked when the object is hidden by another object or the object passes to cross another object in the method for searching for the object, which is moving, through calculation of an image difference between a previous display and a current display in a 2D or still image state. At this time, before the first and/or second 3D information of the object is stored in the database 300, it may be stored in a temporary buffer or an internal memory (not shown) of the monitoring apparatus 200, and directly used as information for tracking a position of the object.

Further, as described above, the information extraction unit 240 may extract the distance information between the object in the 2D image and each of the PTZ cameras 100 on the basis of the zoom scale. The reason why the distance information can be extracted as described above is that it is possible to grasp a zoom function according to characteristics of each of the PTZ camera 100 and a focus position according to the zoom scale. That is, the information extraction unit 240 extracts the distance information between the object and each of the PTZ cameras 100 based on a focus length according to a zoom scale. In this case, the object can be tracked without being missed or unchecked through displaying the distance information between the PTZ cameras 100 and the object on a screen or processing the distance information without using the stereoscopic image camera.

Referring to FIG. 3, in the case of capturing an image of the object using one of the PTZ cameras 100, if it is assumed that a distance of outside between the object (i.e., object that is targeted for image capturing) and a lens of the PTZ camera is Do, a distance of inside between the lens of the PTZ camera 100 and an image sensor of the PTZ camera is Di, and a focus length is f, a relationship of following Equation 1 is established. Here, the distance of outside Do becomes the distance information.

$$\frac{1}{Do} + \frac{1}{Di} = \frac{1}{f} \qquad (1)$$

In this case, since the distance of inside Di is a fixed value and the focus length f is a value determined according to the zoom scale of the PTZ camera, the distance of outside Do may be obtained by the following Equation 2.

$$Do = \frac{Di \times f}{Di - f} \qquad (2)$$

[Equation 2]

Accordingly, the information extraction unit 240 obtains the camera parameters together with the 2D image from the image acquisition unit 220, and extracts the 2D coordinate information based on the pan/tilt angles and the distance information based on the focus length that is determined by the zoom scale. Further, the information extraction unit 240 extracts the height information from the 3D image that is obtained by synthesizing two or more 2D images, which are captured by the plurality of PTZ cameras 100 and acquired by the image acquisition unit 220.

The operation unit 250 calculates variation of the 2D coordinate information and the distance information by comparing a current frame of the 2D image with a previous frame of the 2D image. That is, the operation unit 250 may calculate the variation of the first 3D information (i.e., variation of the 2D coordinate information and the distance information) through comparing the first 3D information of the current frame of the 2D image and the first 3D information of the previous frame of the 2D image.

Further, the operation unit 250 calculates variation of the 2D coordinate information and the height information by comparing a current frame of the 3D image with a previous frame of the 3D image. That is, the operation unit 250 may calculate the variation of the second 3D information (i.e., variation of the 2D coordinate information and the height information) through comparing the second 3D information of the current frame of the 3D image and the second 3D information of the previous frame of the 3D image.

The position tracking unit 260 may track the position of the object through controlling the PTZ camera 100 based on the variation of the 2D coordinate information and the distance information (i.e., variation of the first 3D information). That is, the image of the object can be continuously captured through updating the pan/tilt angles and the zoom scales of the PTZ cameras 100 according to the variation of the 2D coordinate information and the distance information. Thus, even if a focus length is updated according to a zoom scale, the distance information is automatically updated to improve the tracking accuracy of the object.

Further, the position tracking unit 260 may track the position of the object through controlling the PTZ cameras 100 based on the variation of the 2D coordinate information and height information of the object. By acquiring the stereoscopic images using the PTZ cameras 100, the height information of the object can be acquired together with the image variation, and thus, more accurate object tracking becomes possible. In this case, since the PTZ cameras 100 are installed to face one another, it is possible to minimize the dead zone, and the accuracy can be greatly increased as compared with the method for searching for the corresponding position through calculation of the variation of the previous image using the acquired stereoscopic image. That is, since the object is identified through addition of even the height information of the object that is calculated from the stereoscopic images acquired using a plurality of image input devices such as the PTZ cameras 100, performance of an automatic tracking device can be maximized.

The monitoring apparatus 200 using the 3D information of the images as described above may be physically separated from the PTZ cameras 100 and configured as a separate module. Of course, it is apparent to those skilled in the art that the respective constituent elements of the monitoring apparatus 200 using the 3D information of the images can be configured inside at least one of the PTZ cameras 100. Hereinafter, an exemplary embodiment in which a monitoring process using the 3D image is executed inside one PTZ camera will be described.

Figure 4:
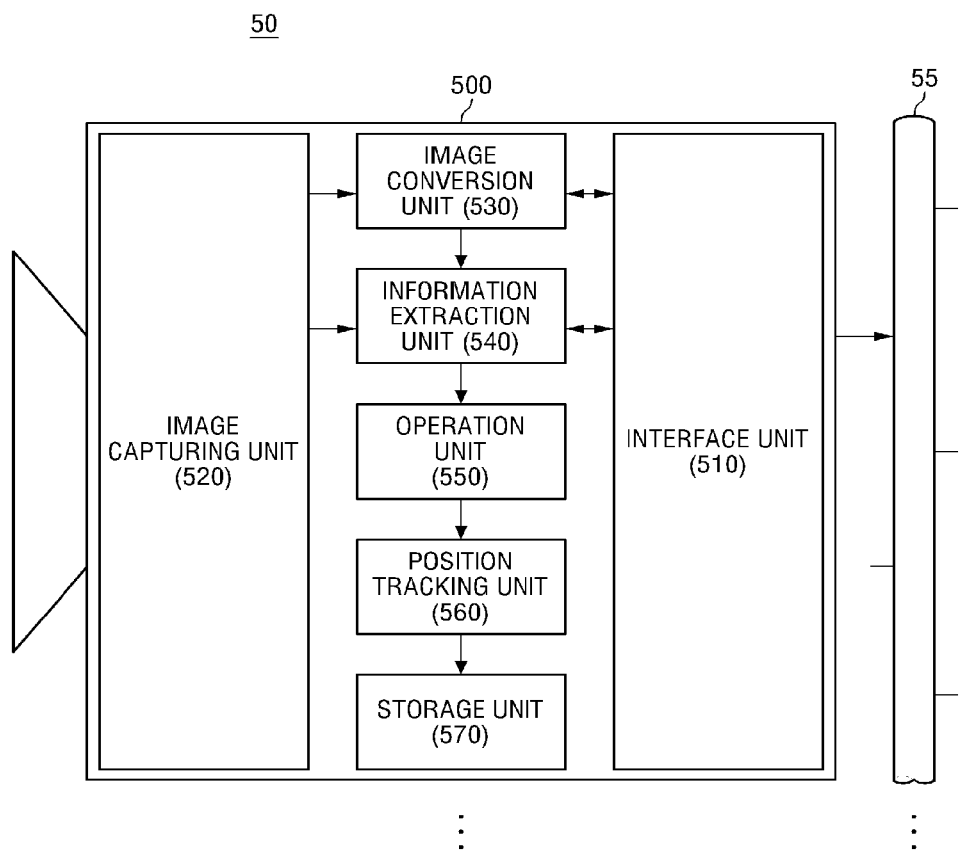
FIG. 4 is a configuration diagram of a monitoring system using 3D information of images according to an exemplary embodiment.

FIG. 4 is a configuration diagram of a monitoring system using 3D information of images according to an exemplary embodiment.

Referring to FIG. 4, a monitoring system 50 using 3D information of images tracks an object by acquiring the 3D information of the images through linking of a plurality of PTZ cameras 500. Here, the respective PTZ cameras 500 transmit/receive information and data with one another through a network 55. As described above, the network 55 may use the Internet protocol. That is, the PTZ camera 500 may be an Internet protocol network camera.

Each of the PTZ cameras 500 includes an interface unit 510, an image capturing unit 520, an image conversion unit 530, an information extraction unit 540, an operation unit 550, and a position tracking unit 560. The PTZ camera 500 may further include a storage unit 570.

The interface unit 510 serves to link the PTZ cameras 500 through the network 55. As described above, separate dedicated communication modules or methods are not required, and thus, the drawback of the prior art may be overcome.

The image capturing unit 520 acquires a 2D image by capturing an image of the object. The image capturing unit 520 acquires the image by capturing a predetermine area. Here, a charge-coupled device (CCD) image sensor or a complementary metal oxide semiconductor (CMOS) image sensor may be used as an image capturing element. The image capturing unit 520 may include a camera module that can perform night photography to sense an accurate situation occurring at night. That is, the camera module may be an infrared sensor that senses infrared rays. It is preferable that the infrared sensor is a near-infrared sensor that senses near-infrared rays, but is not limited thereto. The infrared sensor may also be a far-infrared sensor that senses far-infrared rays. The acquired 2D image may be converted into a compressed format to facilitate data transfer. Image data of the compressed format may have various formats, such as MPEG-1, MPEG-2 or MPEG-4. The 2D image that is captured by the image capturing unit 520 is transferred to the image conversion unit 530.

The image conversion unit 530 synthesizes a 2D image that is captured by the image capturing unit 520 with a 2D image of another PTZ camera that is transferred through the network 55 to convert the 2D images into a 3D image using the image conversion unit 530 of the PTZ camera 500, and then, the distance and height information of the object may be transferred to another PTZ camera. Thus, position tracking of the object which is moving may be performed using the 3D image rather than variation of 2D displays, and also a higher accuracy may be achieved.

The information extraction unit 540 extracts 2D coordinate information of the object based on a pan/tilt angle of the PTZ camera 500, and extracts height information of the object from the 3D image. Further, the information extraction unit 540 extracts distance information between the PTZ camera 500 and the object based on a zoom scale of the PTZ camera 500 itself. Specifically, a focus length according to the zoom scale of the PTZ camera 500 is determined, and the distance information between the PTZ camera 500 and the object is extracted through the above-described Equation 2. Since the detailed functions of the information extraction unit 540 are the same as those of the information extraction unit 240 of the monitoring apparatus using the 3D information as described above, the detailed description thereof will be omitted.

The operation unit 550 calculates variation of the 2D coordinate information and the height information by comparing a current frame of the 3D image with a previous frame of the 3D image. That is, the operation unit 550 may calculate the variation of the second 3D information as described above. Further, the operation unit 550 calculates variation of the 2D coordinate information and the distance information by comparing the current frame of the 2D image and the previous frame of the 2D image. That is, the operation unit 550 may calculate the variation of the first 3D information as described above. Since the detailed functions of the operation unit 550 are the same as those of the operation unit 250 of the monitoring apparatus 200 using the 3D information of the image as described above, the detailed description thereof will be omitted.

The position tracking unit 560 may track the position of the object based on the 3D information that includes one of the height information and the distance information together with the 2D coordinate information of the object. The position tracking unit 560 may track the position of the object through controlling the PTZ camera 500 based on the variation of the 2D coordinate information and the height information (variation of the second 3D information), or may track the position of the object through controlling the PTZ camera 500 based on the variation of the 2D coordinate information and the distance information (variation of the first 3D information). For example, if a plurality of PTZ cameras including the PTZ camera 500 are installed in the same area regardless of their heights, and these PTZ cameras exchange the acquired information with one another and track the same object, the position of the object can be accurately obtained in the 3D coordinate system using at least one of the height information and the distance information together with the 2D coordinate information.

The storage unit 570 stores the 2D coordinate information of the object that is extracted by the information extraction unit 540, the height information of the object, and the distance information between the camera 500 and the object. Further, the storage unit 570 may store camera parameters according to 3D movement of the PTZ camera 500 such as zoom-in/zoom-out, pan and tilt. Here, it is apparent to those skilled in the art that the storage unit 570 may be a constituent element included in the PTZ camera 500 or may be replaced by an external storage medium. If the storage unit 570 is replaced by the external storage medium, the storage unit 570 may be a buffer or memory that temporarily stores various kinds of information acquired and processed by the PTZ camera 500.

Since the plurality of PTZ cameras including the PTZ camera 500 may be linked through the network 55, the monitoring system 50 using the 3D information of the images can transmit the 3D image that is converted by the image conversion unit 530, the 2D coordinate information extracted by the information extraction unit 540, the height information, and the distance information to other PTZ cameras through the network 55, together with the camera parameters. The monitoring system 50 may also calculate the distance between the object and the PTZ camera 500 through calculating a camera focus length and a zoom scale, track the object through exchanging the information in real time with the other PTZ cameras, process the 2D images acquired through the plurality of PTZ cameras as stereoscopic images in the PTZ camera 500, and retransmit the distance and height information of the object to the other PTZ cameras to track the object. If these PTZ cameras are installed in the same area regardless of their heights, these PTZ cameras 500 may be able to exchange respectively acquired information with one another and track the same object. Accordingly, since stereoscopic image cameras are not used, installation costs can be saved. Further, the monitoring system 50 can be easily configured using the PTZ camera 500 generally installed, and the PTZ camera 500 having the Internet protocol interface 510 can also be easily connected and operated. Further, position tracking can be performed with a higher accuracy using the acquired 3D images without performing the position tracking only through the variation of the 2D displays.

Figure 5:
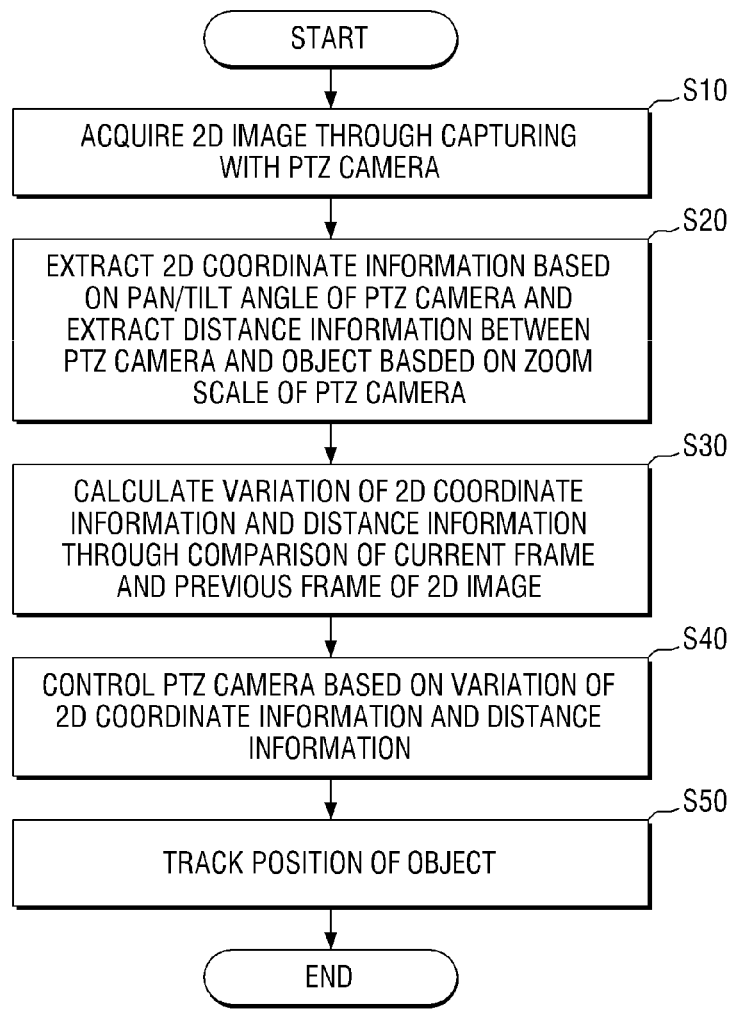
FIG. 5 is a flowchart of a monitoring method using 3D information of images according to an exemplary embodiment.

FIG. 5 is a flowchart of a monitoring method using 3D information of images according to an exemplary embodiment.

Referring to FIG. 5, a monitoring method using 3D information of images according to an exemplary embodiment acquires 2D images using a plurality of PTZ cameras (S10), extracts 2D coordinate information of an object based on pan/tilt angles of each of the PTZ cameras, extracts distance information between each of the PTZ camera and the object based on a zoom scale of each of the PTZ camera (S20), and calculates variation of the 2D coordinate information and the distance information by comparing the current frame and the previous frame of the 2D images (S30). Thereafter, the monitoring method controls the PTZ cameras based on the variation of the 2D coordinate information and the distance information (S40), and tracks the position of the object (S50).

Thus, after the PTZ cameras are installed, the 3D information of the object is extracted using the camera parameters of the PTZ cameras themselves. Based on the extracted 3D information, the moving object can be continuously tracked. Accordingly, the fixed type PTZ cameras are used without installing expensive movable type 3D cameras, and thus, the installation costs can be saved. Further, in the case of using the acquired images as evidential data for criminal identification, the plurality of objects can be discriminated through identification of the distance information and the overlapping object, which may be missed in the existing 2D display, and it is expected that the PTZ cameras having the function of the automatic tracking device can perform seamless object tracking in this method at a high success rate.

The monitoring method using the 3D information of the images according to the above embodiments can be implemented as one module by software and hardware, and the embodiments as described above can be prepared as a program that can be executed in a computer, and can be implemented in a general-purpose computer that operates the program using a recording medium. The computer-readable recording medium may be implemented in the form of a magnetic medium, such as a ROM, a floppy disc, or a hard disk, an optical medium, such as a CD or a DVD. Further, in the computer-readable recording medium, codes, which are distributed in a computer system connected through a network and which can be read by a computer in a distribution method, may be stored and executed.

Although exemplary embodiments have been described for illustrative purposes, those skilled in the art will appreciate that various modifications, additions and substitutions are possible, without departing from the scope and spirit of the inventive concept as disclosed in the accompanying claims.

What is claimed is:

1. A monitoring apparatus comprising at least one processor to implement:
   an image acquisition unit configured to acquire a two-dimensional (2D) image of an object which is captured by a pan/tilt/zoom (PTZ) camera;
   an information extraction unit configured to extract distance information between the PTZ camera and the object based on a zoom scale of the PTZ camera;
   an operation unit configured to calculate variation of the distance information between different frames of the 2D image, and variation of height information of the object between different frames of a 3D image of the object, the height information indicating a height of the object in a 3D space represented by the 3D image; and
   a position tracking unit configured to determine a current position of the object based on the two variations.

2. The monitoring apparatus of claim 1, wherein a plurality of PTZ cameras including the PTZ camera are arranged to be fixed to predetermined positions.

3. The monitoring apparatus of claim 2, further comprising an interface unit configured to connect the plurality of PTZ cameras using an Internet protocol.

4. The monitoring apparatus of claim 3, further comprising an image conversion unit configured to synthesize the 2D image, which is captured by the PTZ camera and acquired by the image acquisition unit, and at least one another 2D image captured by at least one another PTZ camera among the plurality of PTZ cameras, and convert the synthesized 2D images into the 3D image.

5. The monitoring apparatus of claim 4, wherein the information extraction unit extracts the height information of the object from the 3D image.

6. The monitoring apparatus of claim 5, wherein the operation unit is configured to calculate both of the two variations, and
   wherein the position tracking unit determines the current position of the object based on both of the two variations.

7. The monitoring apparatus of claim 1, wherein the information extraction unit extracts the distance information based on a focus length according to the zoom scale of the PTZ camera.

8. A monitoring system comprising a plurality of PTZ cameras, wherein each of the PTZ cameras comprises the monitoring apparatus of claim 1.

9. The monitoring system of claim 8, wherein each of the PTZ cameras comprises an image conversion unit configured to synthesize the 2D image, which is captured by the PTZ camera and acquired by the image acquisition unit, and at least one another 2D image captured by at least one another PTZ camera among the plurality of PTZ cameras, and convert the synthesized 2D images into the 3D image.

10. The monitoring system of claim 9, wherein the information extraction unit extracts the height information of the object from the 3D image.

11. The monitoring system of claim 10, wherein the operation unit is configured to calculate both of the two variations, and
    wherein the position tracking unit determines the current position of the object by controlling of the plurality of PTZ cameras based on both of the variations.

12. The monitoring system of claim 9, wherein the information extraction unit extracts the distance information based on a focus length according to the zoom scale of the PTZ camera.

13. The monitoring system of claim 9, wherein each of the PTZ cameras further comprises a storage unit configured to store the height information and the distance information.

14. The monitoring system of claim 9, wherein each of the PTZ cameras transfers the 3D image converted by the image conversion unit, the height information and the distance information, which are extracted by the information extraction unit, to at least one another PTZ camera among the plurality of PTZ cameras through the network.

15. A monitoring method comprising:
    acquiring a two-dimensional (2D) image captured by a pan/tilt/zoom (PTZ) camera;
    extracting distance information between the PTZ camera and the object based on a zoom scale of the PTZ camera;
    calculating variation of the distance information between different frames of the 2D image, and variation of height information of the object between different frames of a 3D image of the object, the height information indicating a height of the object in a 3D space represented by the 3D image; and
    determining a current position of the object based on the two variations.

16. The monitoring method of claim 15, further comprising:
    synthesizing the 2D image and at least one another 2D image captured by at least one another PTZ camera; and
    converting the synthesized 2D images into the 3D image.

* * * * *